United States Patent [19]

Shibata et al.

[11] Patent Number: 5,620,170
[45] Date of Patent: Apr. 15, 1997

[54] COIL SPRING SUPPORTING DEVICE

[75] Inventors: Tomoyuki Shibata; Yoshimi Noro; Shouji Kimura, all of Aichi, Japan

[73] Assignee: Kabushiki Kaisha Tokai Rika Denki Seisakusho, Aichi, Japan

[21] Appl. No.: 345,770

[22] Filed: Nov. 22, 1994

Related U.S. Application Data

[63] Continuation of Ser. No. 300,103, Sep. 1, 1994, abandoned.

[30] Foreign Application Priority Data

Sep. 6, 1993 [JP] Japan .................. 5-048360 U

[51] Int. Cl.⁶ ........................................ F16F 1/06
[52] U.S. Cl. ........................................ 267/179
[58] Field of Search ........................ 267/179, 180, 267/74

[56] References Cited

U.S. PATENT DOCUMENTS

| | | | |
|---|---|---|---|
| 1,462,925 | 7/1923 | Wilburger | 267/179 |
| 1,548,905 | 8/1925 | Schon | 267/179 |
| 3,132,860 | 5/1964 | Nantz | 267/179 |
| 3,333,863 | 8/1967 | Bishop | 267/179 |
| 4,549,859 | 10/1985 | Andrione et al. | 267/179 |
| 4,672,713 | 6/1987 | Newton et al. | 267/179 |
| 5,219,030 | 6/1993 | Mordick | 267/179 |

FOREIGN PATENT DOCUMENTS

| | | |
|---|---|---|
| 2093712 | 1/1972 | France . |
| 2947990 | 9/1990 | Germany . |

*Primary Examiner*—Matthew C. Graham
*Attorney, Agent, or Firm*—Finnegan, Henderson, Farabow, Garrett & Dunner, L.L.P.

[57] ABSTRACT

A coil-spring-supporting device includes a tension coil spring which includes two small-diameter portions near both ends which portions are smaller in winding diameter than the remaining portion, and a pair of engaging devices provided at a spring mounting region where the tension coil spring is to be mounted, the engaging devices being engaged with the two small-diameter portions in such a manner that the small-diameter portions are held by the engaging devices. Each of the engaging devices is made up of a pair of supporting cylindrical pins.

2 Claims, 1 Drawing Sheet

COIL SPRING SUPPORTING DEVICE

This invention is a continuation of application Ser. No. 08/300,103, filed Sep. 1, 1994, now abandoned.

BACKGROUND OF THE INVENTION

1. Field of the Invention

This invention relates to a device for supporting a coil spring which is suitable for automatically mounting the coil spring.

2. Related Art

For instance, in mounting a tension coil spring on an apparatus, as shown in FIG. 3 the tension coil spring 1 is connected through its hooks 2 at both ends to protrusions which are provided at a spring mounting region of the apparatus.

The above-described conventional tension coil spring is disadvantageous in the following points. In order to automatically mount a number of the above-described tension coil springs on apparatuses, they are put in an automatic part supplying device. In this case, they are liable to be tangled with one another because of the hooks 2, so that it is difficult to regularly supply the tension coil springs 1. On the other hand, in manufacturing the tension coil spring 1, it is considerably difficult to make the right and left hooks 2 of the coil spring 1 bisymmetrical. And, in automatically mounting the tension coil spring, it is difficult to hold with a chuck the tension coil spring which is asymmetrical with a chuck. Thus, it is not practical to automatically mount the tension coil spring 1 with the hooks 2 at both ends. Furthermore, the manufacture of the tension coil spring is relatively large in the number of manufacturing steps, including a primary manufacturing step of winding a wire to form a coil, and a secondary manufacturing step of forming the hooks 2 at both ends of the coil thus formed.

SUMMARY OF THE INVENTION

In view of the foregoing, an object of the invention is to provide a coil-spring-supporting device which prevents the coil springs from being tangled with one another when they are automatically supplied, and, in the manufacture of the coil springs, makes it possible to make the coil spring bisymmetrical, and reduces the number of manufacturing steps.

The foregoing object of the invention has been achieved by the provision of a coil spring supporting device comprising:

a coil spring which includes two small-diameter portions near both ends which portions are smaller in winding diameter than the remaining portion thereof; and a pair of engaging means provided at a spring mounting region where the coil spring is to be mounted, the engaging means being engaged with the two small-diameter portions of the coil spring, respectively.

The coil spring includes the two small-diameter portions near the ends, and has no hooks at the ends. Hence, the coil spring according to the invention is free from the difficulty that, in supplying a number of the coil springs automatically, they are tangled with one another. Furthermore, in forming the coil spring by winding the wire, the small-diameter portions can be formed merely by changing the winding diameter near the ends of coil spring. Hence, the coil spring can be formed bisymmetrical with ease, and its formation requires only the primary manufacturing step of winding a wire to form a coil.

DETAILED DESCRIPTION OF THE PREFERRED EMBODIMENTS

One preferred embodiment of this invention will be described with reference to FIGS. 1 and 2.

Figure 1:
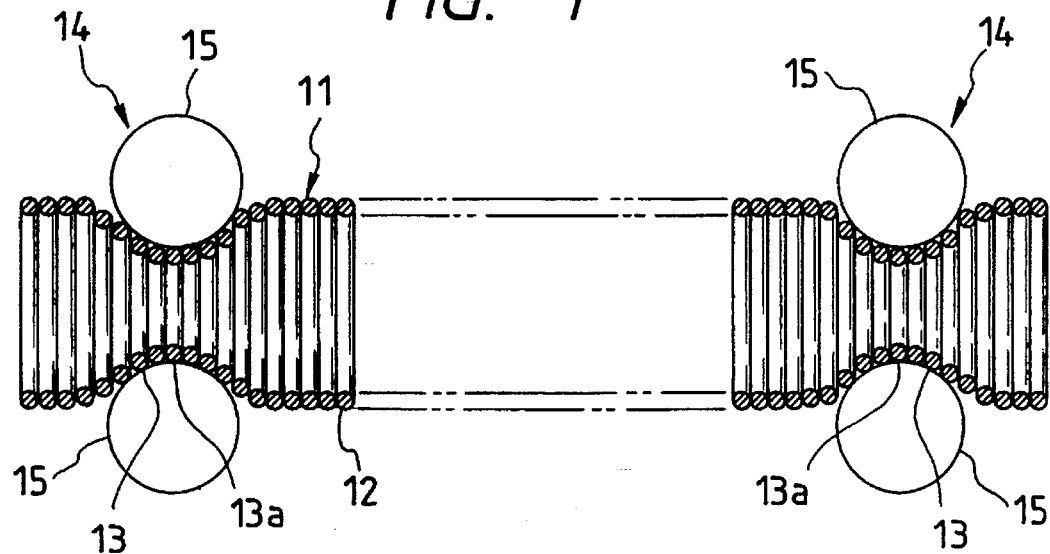
FIG. 1 is a sectional view of a coil-spring-supporting device, which constitutes one embodiment of the invention, showing a tension coil spring engaged with engaging means.
Figure 2:
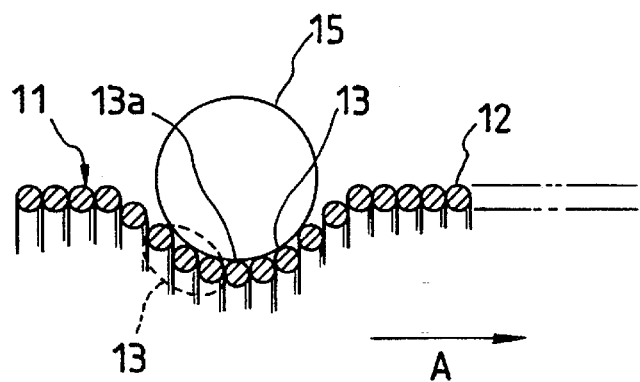
FIG. 2 is a fragmentary sectional view for a description of the action of the coil-spring-supporting device according to the invention.

As shown in FIG. 1, a tension coil spring 11 is formed by cylindrically winding a suitable wire 12. The tension coil spring 11 thus formed includes two small-diameter portions 13 and 13 near its ends which portions are smaller in winding diameter than the remaining portions. More specifically, each of the small-diameter portions 13 is formed as follows: In the small-diameter portion 13, the winding diameter is made gradually smaller in the direction of axis of the coil (in the horizontal direction in FIG. 1) than that of the other portion, and when the winding diameter becomes minimum as indicated at 13a, it is made gradually larger until it becomes equal to that of the other portion. Thus, those small-diameter portions 13 and 13 are arcuate in section.

On the other hand, in correspondence to the two small-diameter portions 13 and 13 of the tension coil spring 11, a pair of right and left engaging means 14 and 14 are provided on a spring mounting region of the apparatus where the tension coil spring 11 is to be mounted. Each of the engaging means 14 is made up of a pair of supporting pins 15 and 15. Those supporting pins 15 are cylindrical pins, and positioned in the spring mounting region so that they engage with the tension coil spring in such a manner that the small-diameter portion 13 is held between them.

Thus, the tension coil spring 11 is mounted on the spring mounting region of the apparatus by engaging its small-diameter portions 13 and 13 with the supporting pins 15 of the right and left engaging means 14 and 14. When a load is applied to the tension coil spring 11 thus mounted to pull the latter 11, the tension coil spring 11 is expanded. In this operation, as shown in FIG. 2 the contact points between the supporting pin 15 and the contact part of the small-diameter portion 13 which is encircled with the broken line in FIG. 2, support the lead acting in the direction of the arrow A. As for the tension coil spring 11, the following general expressions (1) and (2) is established:

$$W = K \cdot \delta \tag{1}$$

where W is the load, K is the spring constant, and $\delta$ is the amount of defection.

$$K = (G \cdot d^4)/(8 \cdot Na \cdot D^3) \tag{2}$$

where G is the modulus of transverse elasticity, the d is the wire diameter, Na is the effective number of turns, and D is the central diameter.

Expression (2) reveals the following fact: The central diameter of the small-diameter portion engaged with the supporting pins 15 is smaller than the central diameter of the middle portion (or the body portion) of the tension coil spring 11, and therefore the spring constant K of the small-diameter portion 13 is large. Hence, the small-diameter portion 13 is able to support the load W with a small amount of deflection.

On the other hand, as for a torsional stress τ, the following general expression (3) is established:

$$\tau = (8 \cdot D \cdot W \cdot k)/(\pi \cdot d^3) \tag{3}$$

where k is the stress correcting coefficient.

The above-described expression (3) reveals the following fact: When the central diameter D is decreased, the torsional stress τ is also decreased, and the small-diameter portion 13 can more effectively support the load than the middle portion (the body portion) of the tension coil spring 11. Hence, the above-described method of supporting the tension coil spring 11 with its small-diameter portions 13 engaged with the supporting pins 15 provides a sufficiently great strength to support the tension coil spring.

Figure 3:
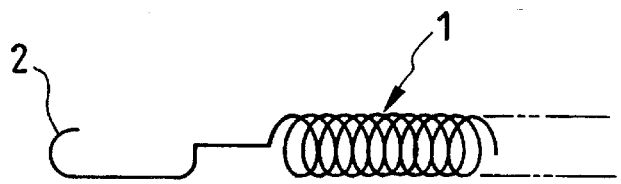
FIG. 3 is a perspective view showing a part of a conventional tension coil spring.

In the embodiment of the invention, the tension coil spring 11 has the small-diameter portions near the ends, and it has no hooks (2 in FIG. 3) at the ends. Hence, the difficulty is positively eliminated that, when a number of tension coil springs 11 are automatically supplied by the automatic part supplying device, they are tangled with one another. Furthermore, in forming the tension coil spring by winding the wire, the small-diameter portions 13 can be formed merely by changing the winding diameter near the ends of the tension coil spring. Hence, the tension coil spring 11 which is bisymmetrical, can be formed with ease, and it can be formed only by the primary manufacturing step of winding a wire to form a coil. Thus, the tension coil spring can be automatically mounted on the apparatus, and in manufacture of the tension coil spring 11, the number of manufacturing steps can be reduced.

As was described above, the coil spring supporting device of the invention comprises: the coil spring which includes two small-diameter portions near both ends; and the pair of engaging means provided at a spring mounting region in such a manner a to engage with the two small-diameter portions of the coil spring. Hence, the difficulty is eliminated that, in supplying a number of the coil springs automatically, they are tangled with one another. In addition, in the manufacture of the coil spring, it is possible to make the coil spring bisymmetrical, and the number of manufacturing steps is decreased.

What is claimed is:

1. A coil spring supporting device comprising:

a coil spring having a length between opposite ends and including a plurality of helical windings having a winding diameter, the coil spring further having two connection portions spaced along the length thereof to be located between said opposite ends, said connection portions being helical windings smaller in winding diameter than the helical windings of the coil spring adjacent opposite sides of each connection portion, thereby to establish at each of said connection portions, an external winding depression; and a pair of engaging members for holding the coil spring, the engaging members being fitted into the external winding depressions established by the two spaced connection portions of the coil spring, respectively.

2. A coil spring supporting device as claimed in claim 1, wherein the connection portions are positioned near both ends of the coil spring.

* * * * *